Patented Feb. 10, 1931

1,792,169

UNITED STATES PATENT OFFICE

GEORG KRÄNZLEIN AND HEINRICH VOLLMANN, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

PROCESS OF PREPARING CONDENSATION PRODUCTS OF THE ANTHRAQUINONE SERIES

No Drawing. Application filed July 6, 1928, Serial No. 290,873, and in Germany July 25, 1927.

Our present invention relates to a new process of preparing condensation products of the anthraquinone series.

In U. S. patent specifications Nos. 1,564,584, dated December 8, 1925, and 1,582,475 dated April 27, 1926, and in the co-pending U. S. application of Georg Kränzlein and Robert Sedlmayr Ser. No. 70,986 filed November 23, 1925, there are described vat dyestuffs which can be obtained by condensing benzanthrone with aromatic carboxylic acid chlorides or carboxylic anhydrides by means of aluminium chloride, advantageously in the presence of oxygen.

Now we have found that vat dyestuffs can likewise be obtained by condensing an arylketone of the following formula:

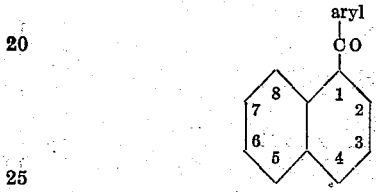

which contains hydrogen atoms in the 4-, 5- and 8-positions, but may be substituted in the remaining positions, by means of aluminium chloride or sodium-aluminium chloride in the presence of oxygen with a compound of the following formula: aryl—CO—X, wherein X stands for a halogen atom or for the group —O—CO—aryl, that is to say with an aromatic carboxylic acid chloride or carboxylic anhydride. It is known that by the action of aluminium chloride the phenyl-α-naphthylketone closes the ring so as to form benzanthrone (cf. "Liebigs Annalen der Chemie" volume 394, page 143). The process according to this invention involves, however, a considerable technical advantage over the processes above referred to, since it renders it possible to obtain the same favorable result by substituting for the comparatively expensive benzanthrone a cheaper naphthalene derivative.

The following examples are given by way of illustration, it being understood that they are in no way limitative; the parts are by weight:

1. 46 parts of α-benzoylnaphthalene are mixed with ten times their weight of aluminium chloride and 140 parts of benzoyl chloride and molten at about 125° C. for a prolonged time, say 20 to 60 hours, with introduction of oxygen. On decomposing the melt with water, the crude dyestuff precipitates in the form of brown flakes. The crude product is purified by treating it with a solution of sodium hypochlorite containing 10 to 12 per cent of reactive chlorine or by revatting it, and thus yields the golden-yellow 3.4.8.9-dibenzpyrenquinone-5.10 of the following formula:

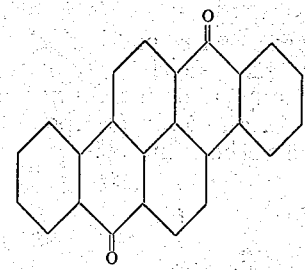

2. 40 parts of α-benzoylnaphthalene are finely ground (triturated) with 230 parts of aluminium chloride and the mixture is stirred at about 120° C. to 130° C. for about 2 to 3 hours. There are then added another 230 parts of aluminium chloride and 140 parts of benzoyl chloride and the melt is stirred at about 125° C. for about 48 hours, oxygen being introduced. The crude dyestuff is worked up and purified in the manner indicated in the preceding example. The dyestuff thus obtained is identical with the dyestuff obtained according to Example 1.

3. 40 parts of α-benzoylnaphthalene are mixed, while stirring and introducing air, with 400 parts of sodium-aluminium chloride at about 115° C. to 120° C. for 2½ hours. There are then gradually added 80 parts of benzoyl chloride and the temperature is kept at 130° C., the introduction of air being continued. After about 48 hours the melt is decomposed and the crude product is purified in the usual manner. The dyestuff thus obtained is identical with that obtainable according to Example 1.

4. By melting α-benzoylnaphthalene with aluminium chloride for about 2 to 3 hours in the manner indicated in Example 1 and substituting for the benzoyl chloride 100 parts of benzoic anhydride and finally decomposing the melt after about 48 hours, the same crude dyestuff is obtained which can be purified as described in Example 1.

Instead of α-benzoylnaphthalene there may also be used other α-aroylnaphthalenes, for instance chlorobenzoyl-, toluyl- α-naphthalene derivatives or the like.

We claim:

1. The process for making dibenzpyrenquinones which consists in reacting in the presence of oxygen at a temperature of between 110° C. and 150° C. upon an arylketone of the following formula:

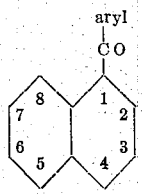

which contains hydrogen atoms in the 4-, 5- and 8-positions, but may be substituted in the other positions, with aluminium chloride and a compound of the following formula: aryl—CO—X, wherein X stands for a halogen atom or for the group —O—CO—aryl.

2. The process for making dibenzpyrenquinones which consists in reacting in the presence of oxygen at a temperature of between 110° C. and 150° C. upon α-benzoylnaphthalene of the formula:

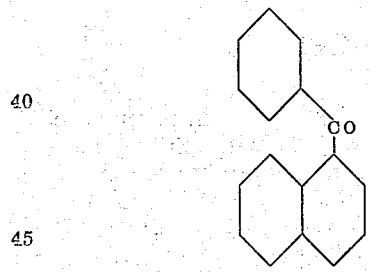

with aluminium chloride and a compound of the following formula: aryl—CO—X, wherein X stands for a halogen atom or for the group —O—CO— aryl.

3. The process for making dibenzpyrenquinones which consists in reacting in the presence of oxygen at a temperature of between 110° C. and 150° C. upon an arylketone of the following formula:

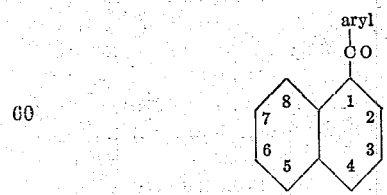

which contains hydrogen atoms in the 4-, 5- and 8-positions, but may be substituted in the other positions, with aluminium chloride and benzoyl chloride.

4. The process for making dibenzpyrenquinones which consists in reacting in the presence of oxygen at a temperature of between 110° C. and 150° C. upon α-benzoylnaphthalene of the formula:

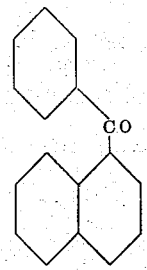

with aluminium chloride and benzoyl chloride.

5. The process for making dibenzpyrenquinones which consists in reacting with aluminium chloride and benzoyl chloride in the presence of oxygen at about 125° C. for 20 to 60 hours upon α-benzoylnaphthalene of the formula:

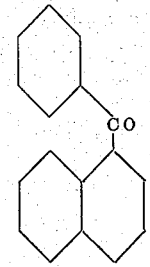

In testimony whereof, we affix our signatures.

GEORG KRÄNZLEIN.
HEINRICH VOLLMANN.